United States Patent
Ehrenberger et al.

(10) Patent No.: US 8,276,643 B2
(45) Date of Patent: Oct. 2, 2012

(54) ROLLER BLIND SYSTEM FOR A MOTOR VEHICLE

(75) Inventors: Marina Ehrenberger, Ebersbach (DE); Roman Sauer, Reutlingen/Sondelfingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 90 days.

(21) Appl. No.: 12/804,925

(22) Filed: Aug. 2, 2010

(65) Prior Publication Data

US 2011/0030905 A1 Feb. 10, 2011

(30) Foreign Application Priority Data

Aug. 10, 2009 (DE) .................. 10 2009 037 824

(51) Int. Cl.
*B60J 1/20* (2006.01)

(52) U.S. Cl. .................. 160/370.22; 160/23.1; 160/265; 296/97.8; 296/180.1

(58) Field of Classification Search ............. 160/370.22, 160/23.1, 24, 265, 31; 296/180.1, 97.8
See application file for complete search history.

(56) References Cited

U.S. PATENT DOCUMENTS

| | | | | |
|---|---|---|---|---|
| 1,481,491 | A * | 1/1924 | Vineberg et al. | 160/23.1 |
| 3,050,075 | A * | 8/1962 | Kaplan et al. | 296/98 |
| 5,211,718 | A | 5/1993 | Goetz et al. | |
| 5,658,039 | A | 8/1997 | Bennett | |
| 5,707,099 | A | 1/1998 | Schrader et al. | |
| 6,191,886 | B1 * | 2/2001 | Sinkoff | 359/443 |
| 6,216,762 | B1 * | 4/2001 | Lin | 160/370.22 |
| 6,763,874 | B1 | 7/2004 | Chen | |
| 7,014,243 | B2 * | 3/2006 | Nakajo | 296/97.4 |
| 7,198,321 | B2 | 4/2007 | Eisenschmidt et al. | |
| 7,559,600 | B2 | 7/2009 | Neubrand | |
| 7,686,375 | B1 * | 3/2010 | Schlotterer et al. | 296/97.8 |
| 7,828,039 | B2 | 11/2010 | Starzmann et al. | |
| 2005/0057072 | A1 | 3/2005 | Eisenschmidt et al. | |
| 2005/0194109 | A1 | 9/2005 | Starzmann et al. | |
| 2007/0170752 | A1 | 7/2007 | Neubrand | |
| 2009/0014136 | A1 | 1/2009 | Lekar | |
| 2010/0289294 | A1 * | 11/2010 | Lehmann et al. | 296/180.1 |

(Continued)

FOREIGN PATENT DOCUMENTS

DE  40 37 705 C1  10/1991

(Continued)

OTHER PUBLICATIONS

German language Office Action, dated Mar. 22, 2010 (4 sheets).

(Continued)

*Primary Examiner* — Blair M. Johnson
(74) *Attorney, Agent, or Firm* — Flynn, Thiel, Boutell & Tanis, P.C.

(57) ABSTRACT

A protection or shading system for a motor vehicle, in particular a wind deflector system for a convertible, with a base, a sheet-like structure entendable between an inoperative position and a functional position in an extension direction away from the base, a rigid end element fastened to the sheet-like structure, and an extension device fastened on one side to the base and on the other side to the end element. The extension device is designed so as to transfer the system from an inoperative state in which the sheet-like structure, the end element and the extension device are each in an inoperative position, into a functional state, in which the sheet-like structure, the end element and the extension device are each in a functional position.

12 Claims, 4 Drawing Sheets

U.S. PATENT DOCUMENTS

2011/0030905 A1 * 2/2011 Ehrenberger et al. ......... 160/309

FOREIGN PATENT DOCUMENTS

| DE | 43 15 139 A1 | 11/1993 |
| --- | --- | --- |
| DE | 44 30 672 C1 | 12/1995 |
| DE | 195 36 552 A1 | 4/1997 |
| DE | 197 28 453 A1 | 1/1999 |
| DE | 101 34 613 A1 | 2/2003 |
| DE | 102 39 200 A1 | 3/2004 |
| DE | 103 41 989 A1 | 4/2005 |
| DE | 10 2005 029 692 A1 | 12/2006 |
| DE | 10 2006 046 445 A1 | 4/2008 |
| DE | 10 2008 006 157 A1 | 10/2008 |
| DE | 10 2007 051 987 A1 | 5/2009 |
| EP | 0 599 811 A1 | 6/1994 |
| EP | 1 514 714 A1 | 3/2005 |
| EP | 1 568 526 A2 | 8/2005 |
| EP | 2 014 492 A2 | 1/2009 |
| WO | WO 2005/080105 A2 | 9/2005 |

OTHER PUBLICATIONS

European Patent Office Search Report from European Application No. 10007494.7 dated Jan. 21, 2011 (6 pages) with English translation of "A" and "X" categories of documents cited.

* cited by examiner

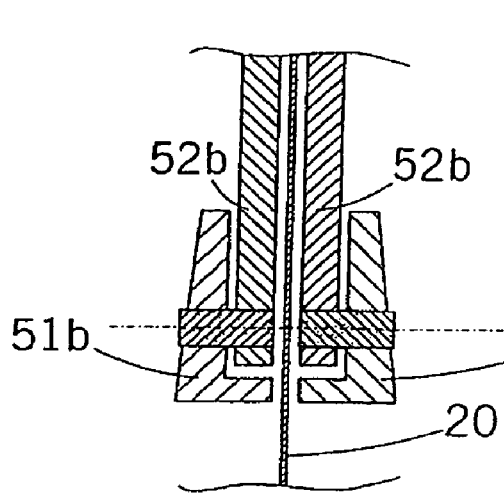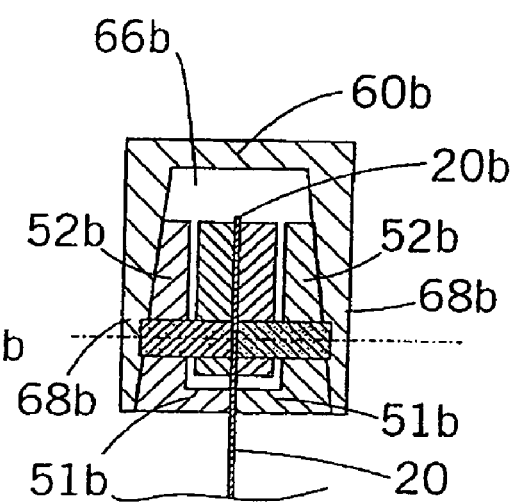
*Fig. 3a*      *Fig. 3b*

ROLLER BLIND SYSTEM FOR A MOTOR VEHICLE

Field of the Invention

The invention relates to a protection or shading system for a motor vehicle, in particular a wind deflector system for a convertible.

Such a protection or shading system of the type in question has a base, a sheet-like structure which can be extended between an inoperative position and a functional position in an extension direction away from the base, a rigid end element which is fastened to the sheet-like structure and is provided at the distal end of the sheet-like structure with respect to the base, and an extension device which is fastened on one side to the base and on the other side to the end element. In this case, the extension device is designed so as, by means of mechanical activation by means of a driving means, to transfer the system from an inoperative state, in which the sheet-like structure, the end element and the extension device are each in an inoperative position, into a functional state, in which the sheet-like structure, the end element and the extension device are each in a functional position.

BACKGROUND OF THE INVENTION

Protection or shading systems of the type in question are known from the prior art. They can be used for different purposes in a motor vehicle. As shading systems, they are preferably arranged in the region of windows and in the functional position of said shading systems, cover said windows in such a manner that the incidence of sunlight is reduced. As protection devices, they can be used, for example, to separate off a luggage compartment region of the motor vehicle from a passenger region. In particular, using a separating net as the sheet-like structure, items of luggage can be prevented from being hurled into the passenger region of the vehicle in the event of an accident.

Of particular relevance in the context of the present invention are protection devices which are configured as wind deflector systems and which are arranged behind the seats of a convertible motor vehicle in order to reduce the effect of the slipstream on the passenger region of the vehicle when the folding top is open.

A system of the type in question is known, for example, from U.S. Pat. No. 6,763,874 B1. Said system has two extension devices which consist of two levers which are coupled to each other and to the base and an extension rod. By means of a movement of the lever on the base side, the extension rod can be spaced apart from the base and, in the process, can unroll a sheet-like structure which has been rolled up previously on a winding shaft. However, the levers which form the extension device are considered disadvantageous in terms of esthetic. Although it is also known from the prior art to use lateral guide rails in protection or shading systems instead of an extension device to guide the end element, this is not possible in every installation situation and in particular not in wind deflector systems which are freestanding in the functional state.

With regard to wind deflector systems, DE 101 34 613 A1 and DE 43 15 139 A1 disclose systems in which provision is made for the end element to be raised manually to transfer the system into the functional state, wherein pivotable side segments overlap the raised end element in the inoperative state and secure the position of the displaced end element in the functional state. Furthermore, DE 103 41 989 A1 and DE 10 2005 029 692 A1 disclose wind deflector systems in which a motor-driven transfer into the functional state is provided. Use is made here of lever elements which are provided on both sides of the sheet-like structure in order to raise the end element in the direction of the functional position.

SUMMARY OF THE INVENTION

It is the object of the invention to develop a protection or shading system of the type in question for a motor vehicle to the effect that said system in particular satisfies esthetic requirements.

According to the invention, this is achieved by the provision of a covering panel which is coupled pivotably to the base and can be pivoted into a first pivoted position, in which said covering panel bears against the extension device in the functional position thereof, or at least partially surrounds said extension device.

A base within the context of this invention is considered to be a part of the protection or shading system, which part is preferably mounted on the vehicle. Said base preferably comprises a receiving space for the sheet-like structure in the inoperative position thereof, in particular a receiving space in which a winding shaft is provided for receiving the sheet-like structure. Furthermore, said base preferably comprises a driving means for actuating the at least one extension device, in particular an electric motor provided for this purpose, if appropriate, together with a gear mechanism, and coupling or fixing sections for the fastening of the extension device on the base.

The extension device involves those elements which are movable in relation to the base and the end element in order by movement of said elements to bring about the variable spacing of the end element from the base. The extension device may be designed, for example, as a telescopic device with members which are telescopic in relation to one another. An extension device which has levers which are coupled pivotably to the base and/or to the end element and move the end element in relation to the base by means of a pivoting movement brought about by means of the driving means is preferred. Conceivable configurations with levers of this type are also explained below. The extension device is preferably arranged in such a manner that the elements forming the extension device are arranged on the border of the sheet-like element, at least in the functional state of the system, i.e. at least in sections and not spaced further than 30 mm from a side edge of the sheet-like structure. As a result, in the functional state, the sheet-like structure is not overlapped in an unesthetic manner in a central region by the extension device.

Reference is in each case made below to only one extension device. However, it is considered advantageous if two extension devices are provided which are preferably formed mirror-symmetrically and which furthermore are preferably each arranged in the border region of the sheet-like structure in the functional state. The effect which can be achieved by the use of two extension devices is that the forces acting transversely with respect to the extension direction on the sheet-like structure and the end element by means of the extension devices compensate for one another such that a resulting application of force takes place only in the extension direction or counter to the extension direction. Each reference to an extension device within the scope of the explanation below should be understood as applicable to both extension devices.

The end element constitutes an at least substantially rigid end of the sheet-like structure and serves for the guidance and uniform application of force to the sheet-like element during the transfer from the inoperative position into the functional position and vice versa. The sheet-like structure itself is preferably wound up in the inoperative position on a roller blind shaft which is acted upon in a winding-up direction by means of a winding spring around the ends.

According to the invention, a covering panel which can be pivoted in relation to the base is provided on the base. In the case of a system with two extension devices, two covering panels are preferably provided. The covering panel is arranged in such a manner that, in the first pivoted position, said covering panel bears against the extension device in the functional position thereof, or at least partially surrounds said extension device. As a result, the covering panel can overlap esthetically disadvantageous parts of the extension device and can improve the esthetic impression of the protection or shading system in the functional state. In the simplest case, the covering panel conceals the extension device only with regard to a certain viewing direction, for example, with regard to the viewing direction of the passengers seated in the vehicle. However, it is considered advantageous if the covering panel surrounds the extension device such that at least some sections of the extension device in the functional position thereof are arranged in a cavity of the covering panel. A configuration is very particularly advantageous, in which the covering panel not only at least partially surrounds the extension device but surrounds the side edge of the sheet-like structure by means of two panel sections on opposite sides of the sheet-like structure. In a configuration of this type, in addition to the esthetic task thereof, the covering panel also takes on a fixing task by preventing the sheet-like structure from being deflected in the functional position out of the desired position thereof, for example, by means of the slipstream.

The covering panel is coupled to the base in a pivotable manner, preferably about a pivot axis spaced apart from pivot axes of the extension device. In the first pivoted position thereof, the covering panel preferably extends as far as the end element in the functional position thereof, this still comprising a spacing of less than 20 mm. When the covering panel is extended in this way, the extension device can be completely or virtually completely concealed by the covering panel. The covering panel is preferably of elongate design and is aligned in the first pivoted position thereof in such a manner that the main extension axis thereof, which axis reaches from the pivot axis of the covering panel as far as the distal end thereof, is aligned at least substantially (±5°) with the side edge of the sheet-like structure in the functional position thereof. The pivot axis of the covering panel is preferably aligned orthogonally to the plane of the sheet-like structure in the functional position thereof such that the covering panel is pivotable in a plane parallel to the sheet-like structure.

It is considered particularly advantageous if the extension device has two lever members, a first lever member being coupled pivotably to the base, and a second lever member being coupled pivotably to the first lever member and pivotably to the end element. Such a configuration of the extension device has proven particularly reliable. However, in particular in the case of an extension device of this type, the coupling of the lever members to one another is disadvantageous esthetically and therefore the use of a covering panel according to the invention is of particular advantage. The lever members are preferably designed and coupled to the end element and to the base in such a manner that, in a stretched position, in which said lever members are approximately aligned with one another, they are oriented approximately parallel to the side edge of the sheet-like structure. In this development, the pivot axes of the lever members are oriented, preferably without exception, orthogonally to the plane of the sheet-like structure in the functional position thereof.

A particularly advantageous configuration with an extension device having two lever members makes provision for one of the lever members, in particular the lever member coupled to the base, to overlap the other lever member, at least for the predominant part, in the functional position of the extension device.

In a particularly advantageous configuration of the invention, provision is made for the covering panel to be pivotable into a second pivoted position, in which it at least partially overlaps the end element in the extension direction in the inoperative position thereof, is aligned with a central section of the end element, and/or at least partially covers an extension opening provided for the sheet-like structure on the base. This second pivoted position of the covering panel is assigned to the inoperative state of the system. It is configured in such a manner that the main extension direction of the covering panel in said second pivoted position runs approximately orthogonally to the extension direction. Provision is preferably made for a distal end edge of the sheet-like structure and/or for the end element at the distal end of the sheet-like structure to be at least partially overlapped by the covering panel in the second pivoted position thereof, in which case in particular preferably only a central section of the end element is not overlapped by the covering panel or the covering panels in the inoperative position of said end element. This second pivoted position is particularly of advantage in a system having a sheet-like structure tapering toward the distal end, since, in such a case, the end element is designed to be narrower than the extension opening on the base. The covering panel or the covering panels may overlap those border regions of the extension opening which are not closed by the end element, and therefore the extension opening is substantially completely closed in the inoperative state of the system.

It is considered advantageous if the end element has a tapered side section laterally adjoining the central section, wherein the covering panel preferably only overlaps the tapered side section in the second pivoted position. In this case, a step is preferably provided between the central section and the side section such that the covering panel in the second pivoted position provides the visual appearance of being aligned with the central section. It is particularly of advantage if the side section is of bent or curved design such that an outside end of the side section is aligned with the side edge of the sheet-like structure. The effect achieved by this is that, in the functional state of the system, said end is aligned with the extension device and/or the covering panel and, as a result, provides the appearance of a uniform frame around the sheet-like structure.

It is furthermore considered preferable if the extension device and the covering panel are coupled mechanically to each other, or are coupled mechanically to a common control member such that the sheet-like structure can be moved in the extension direction and the covering panel can be pivoted via a common driving means, in particular via an electric motor of the system. A common driving means is therefore sufficient to move the extension device and the covering panel. In comparison to a solution having two separate driving means, there is furthermore the advantage that the coordination of the movements with one another is predetermined simply by means of the mechanical operative coupling.

It is considered particularly preferred if the mechanical operative coupling is designed in such a manner that, when the system is transferred by the common driving means from the inoperative state into the functional state, the end section starts moving only after the pivoting movement of the covering panel has begun. The effect achieved by such a mechanical coupling is that the covering panel has already covered part of the travel thereof between the second and the first pivoted position when the transfer of the end element into the functional position thereof begins. This avoids a collision and/or grinding noises between the covering panel and the end element. This is preferably achieved structurally in that the extension device is coupled to the control member via an elongated hole with a bolt projecting therein.

Furthermore, it is considered advantageous if the covering panel is mechanically coupled to the common driving means in such a manner that, during the transfer from the second pivoted position into the first pivoted position, the covering panel is first of all moved beyond the first pivoted position and is subsequently moved back into the first pivoted position. In this case, the mechanical coupling is designed in such a manner that a uniform driving direction of the driving means in two phases adjoining each other results in an opposed movement of the covering panel. The effect which can be achieved by moving the covering panel beyond the first pivoted position is that the extension device first of all at least approximately reaches the functional position thereof before the covering panel returns into the first pivoted position thereof.

In a preferred configuration, a spring means is provided, said spring means being arranged and/or designed in such a manner that torque is applied to the covering panel in the second pivoted position in the direction of the first pivoted position. By this means, a particularly simple mechanical coupling of the covering panel to the driving means is possible, since said mechanical coupling has to be designed merely to act upon the covering panel counter to the spring force in order to bring about a transfer from the first pivoted position into the second pivoted position. An application of torque in the opposite direction is brought about at least phase-wise solely by the spring means.

In a particularly preferred configuration, the extension device and the covering panel are designed for interaction in such a manner that, in the functional position of the extension device and in the first pivoted position of the covering panel, said extension device and covering panel together bring about a fixing action on the sheet-like structure.

According to this development, the extension device, at least some of the components of which are moved relative to the sheet-like structure during the transfer from the inoperative position into the functional position, interacts with the covering panel in the first pivoted position thereof in such a manner that a fixing action is obtained. Said fixing action can consist in particular in that a side edge of the sheet-like structure is clamped. This can be achieved firstly by subcomponents of the extension device, which subcomponents are mounted on opposite sides of the sheet-like structure, being pressed toward one another by the covering panel in the first pivoted position thereof and thereby securely clamping the sheet-like structure. As an alternative, it is also possible for the sheet-like structure to be clamped between the covering panel and the extension device.

BRIEF DESCRIPTION OF THE DRAWINGS

Further aspects and features of the invention emerge from the claims and also from the description below of a preferred exemplary embodiment of the invention, which is explained below with reference to the figures, in which:

FIGS. 3a and 3b show the interaction between an extension device and a covering panel of the system according to FIGS. 1a and 1b in the functional state.

DETAILED DESCRIPTION OF THE EXEMPLARY EMBODIMENTS

Figure 1A:
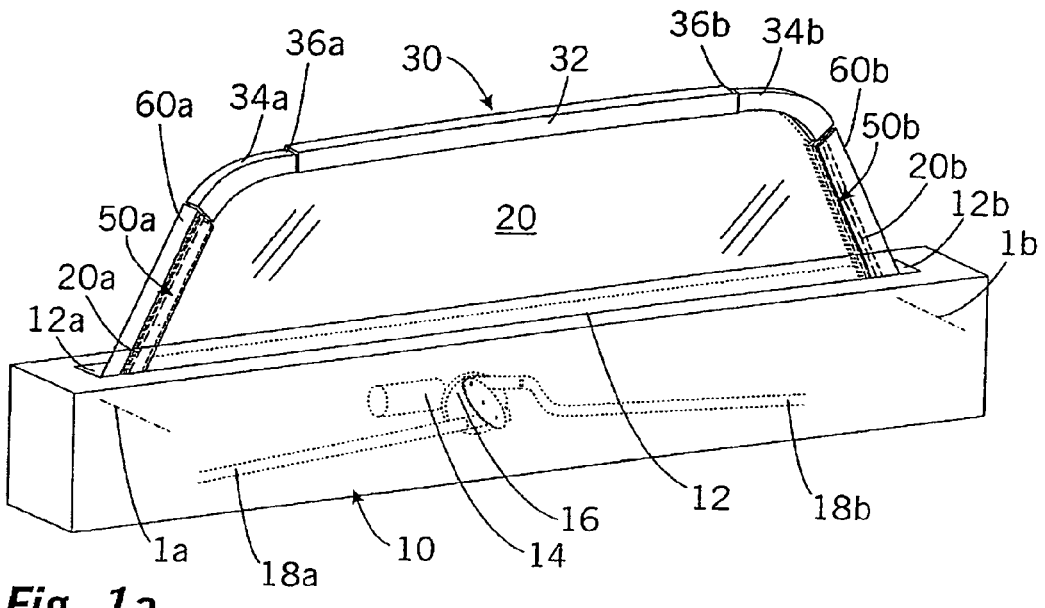
FIGS. 1a and 1b show a protection or shading system according to the invention in a functional state and in an inoperative state.
Figure 1B:
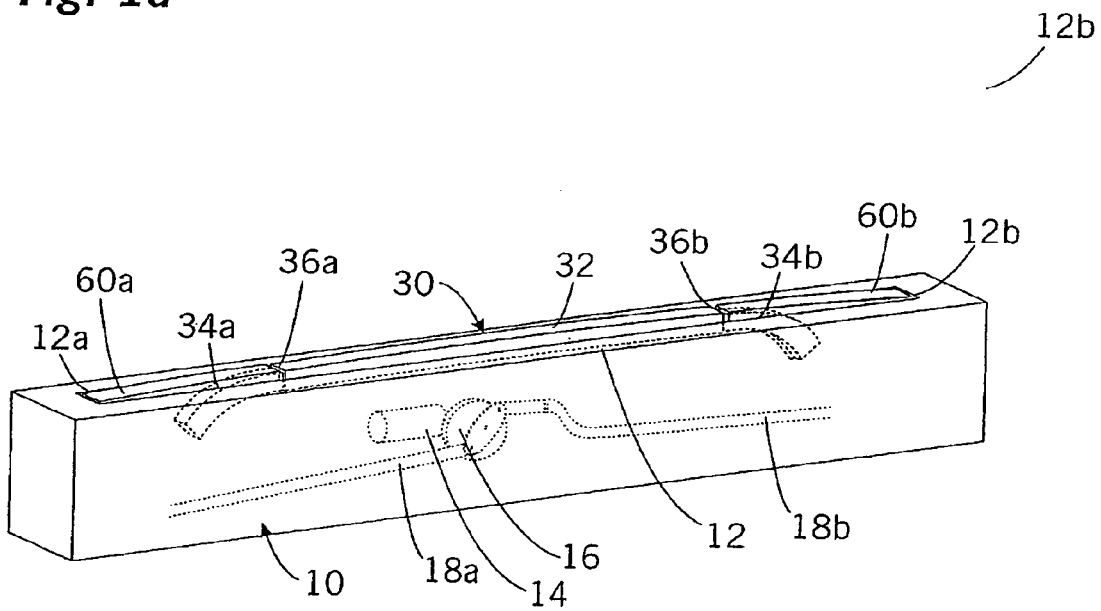

FIGS. 1a and 1b show a protection or shading system according to the invention. This may in particular involve a wind deflector system for a convertible, which system is arranged in a region behind the vehicle seats in order, in the functional state of FIG. 1a to reduce air vortices in the passenger region of the vehicle.

The system has a base 10 which can be arranged in a positionally fixed manner in a vehicle. The upper side of said base 10 is provided with an outlet slot 12 through which a sheet-like structure 20, for example a textile sheet-like structure or a net, to the distal end of which an end element 30 is attached, can be extended out of the base 10. A winding shaft 22 which is not illustrated in FIGS. 1a and 1b and is provided for receiving the sheet-like structure 20 in the inoperative state of FIG. 1b is arranged within the base 10. The mechanical energy required for displacing the sheet-like structure 20 and the end element 30 out of the inoperative position of FIG. 1b into the functional position of FIG. 1a is provided by an electric motor 14 which acts via a gear mechanism 16 (not illustrated specifically) on two control rods 18a, 18b. Said control rods 18a, 18b are operatively connected in a manner explained in detail below with reference to FIGS. 2a and 2d to extension devices 50a, 50b which are illustrated by dashed lines in FIG. 1a and coupled on one side to the base 10 and on the other side to the end element 30.

Since said extension devices 50a, 50b are considered to be disadvantageous esthetically, U-shaped covering profiles 60a, 60b are provided, said covering profiles, in the functional state of FIG. 1a, projecting from the outside over the extension devices 50a, 50b which are arranged on the side border 20a, 20b of the sheet-like structure in said functional state, and, as a result, conceal said extension devices.

The covering profiles 60a, 60b which can be pivoted about pivot axes, 1a, 1b, have a sufficient length in the main extension direction thereof in order, in the functional state of FIG. 1a, to reach approximately as far as the end element 30. In the functional state, the extension devices 50a, 50b are therefore completely or virtually completely concealed.

The end element 30 itself has a central section 32 and laterally adjoining side sections 34a, 34b. The cross section of the end element corresponds in the region of the central section 32 and at the outer ends of the side sections 34a, 34b, which ends are drawn downward in an arcuate manner, approximately to the outside cross section of the covering profiles 60a, 60b. The side sections 34a, 34b taper from the outside to the inside such that a step 36a, 36b is provided between the outer ends of the central section 32 and the inner end of the side sections 34a, 34b.

In the functional state of FIG. 1a, a particularly esthetic appearance is produced by the corresponding outer cross sections of the covering profiles 60a, 60b and the outer end of the side sections 34a, 34b, since there is no cross-sectional gap between the distal ends of the covering profiles 60a, 60b and the outer ends of the side sections 34a, 34b of the end element 30.

In the inoperative state of FIG. 1b, the sheet-like structure 20 and the end element 30 are substantially completely received in the base 10. In said inoperative state, the covering profiles 60a, 60b are pivoted in such a manner that they are approximately aligned with the central section 32 of the end element 30. In this case, the covering profiles 60a, 60b overlap the side sections 34a, 34b of the end element 30. This is possible owing to the configuration which is tapered in relation to the central section 32 at least in the horizontal sub-region of the side sections 34a, 34b. The position of the covering profiles 60a, 60b in the inoperative state of FIG. 1b results in an esthetically advantageous covering of lateral sub-regions 12a, 12b of the outlet slot 12, which sub-regions are not closed by the end element 30 because of the smaller width thereof in comparison to the width of the outlet slot 12. A particularly esthetic appearance is also produced in said inoperative state owing to the abovementioned, coinciding outer cross sections of the central section 32 and the covering profiles 60a, 60b.

FIGS. 2a to 2d show a schematic view of the transfer of the system from the inoperative state of FIG. 1b to the functional state of FIG. 1a.

The elements used for mechanically coupling the motor 14 to the end element 30 and to the covering profiles 60a, 60b will firstly be explained with reference to FIG. 2a. The illustrations in FIGS. 2a to 2d each show only the right-hand side of the mechanism assigned to the extension device 50b and the covering profile 60b. However, the opposite left side is identical apart from aspects which have no further relevance with regard to the movement of the control rods 18a, 18b.

As already mentioned, the distal end of the sheet-like structure 20 is fastened to the end element 30. In the inoperative position of FIG. 2a, the opposite end of the sheet-like element 20 is rolled up on the winding shaft 22 to which a torque is applied in the winding-up direction by a winding spring (not illustrated) in the winding-up direction.

The control rod 18b which is connected to the motor via a gear mechanism 16 in the manner illustrated in FIG. 1a is coupled pivotably at the opposite end thereof to a control member 70b illustrated by long dashes. Said control member 70b is designed such that it can pivot about a pivot axis 3 mounted on the base. The extension device 50b already mentioned has a first lever 51b which is illustrated by short dashed lines and is likewise coupled to the base in a manner such that it can pivot about said pivot axis 3 mounted on the base. A second lever 52b which is illustrated by means of dots is pivotably coupled to said first lever 51b, the opposite end of which second lever is coupled to the end element 30 in a manner such that it can pivot about a pivot axis 4 on the end element side. Therefore, pivoting of the first lever 51b about the axis 3 leads in a manner explained in more detail below to a movement of the end element 30 in the extension direction 2.

Although both the control member 70b and the first lever 51b of the extension device 50b are mounted in a manner such that they can pivot about the axis 3, they do not always move together with each other. Coupling between the control member 70b and the lever 51b is realized via an elongated hole 72b on the control member 70b and a bolt 53b on the first lever 51b. Said elongated hole 72b makes it possible for the control member 70b to rotate to a limited extent in the clockwise direction about the axis 3 without this resulting in a pivoting movement of the first lever 51b. This is also explained in detail below.

The covering profile 60b is mounted on the base in a manner such that it can pivot about a pivot axis 1b which is spaced apart from the axis 3 but is likewise mounted on the base. The extension profile 60b is coupled to the control member 70b primarily via an intermediate lever 80b (illustrated by dots) which is likewise mounted on the base in a manner such that it can pivot about the pivot axis 3. Said intermediate lever 80b has a first lever section 81b, at the end of which a pin 82b is provided, which pin is received in an elongated hole slot 62b provided on the covering profile 60b. Opposite the lever section 81b, the intermediate lever 80b has a further lever section 83b which extends radially outwards from the pivot axis 3. Said second lever section 83b is firstly a coupling point of a spring means in the form of a helical tension spring 90b, the first end of which is fastened in a positionally fixed manner to the base and the second end of which is fastened in a positionally fixed manner to the above-mentioned lever section 83b, and secondly serves to interact with the control member 70b. For the purpose of said interaction, a pin 74b is provided on the control member 70b, said pin bearing against the lever section 83b of the intermediate lever 80b in the inoperative position of FIG. 2a.

Figure 2A:
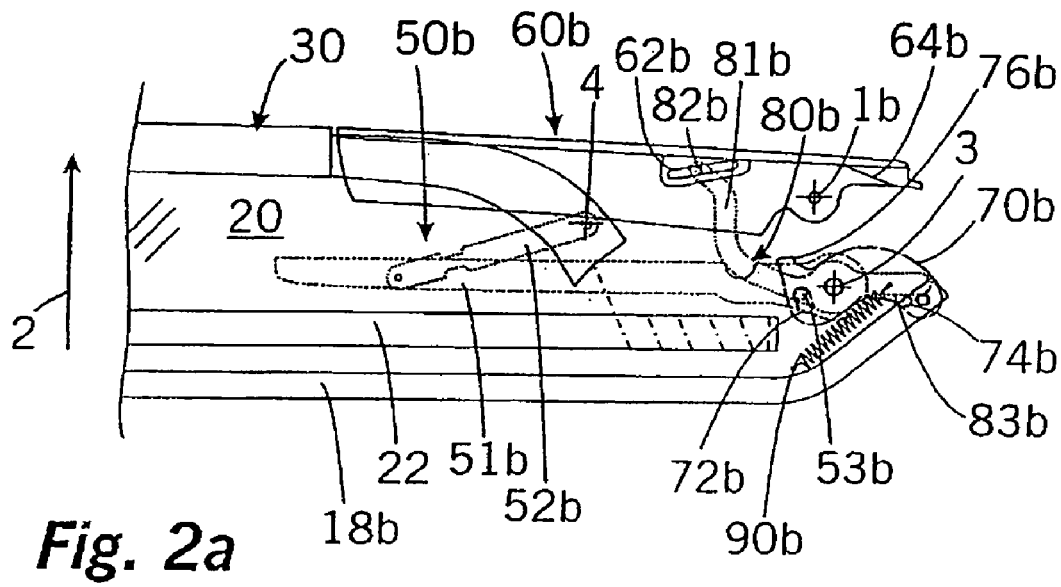
FIGS. 2a to 2d show the mechanism of the system according to the invention during the transition from the inoperative state into the functional state.

Transfer into the functional state from the inoperative state of FIG. 2a takes place by the electric motor 14 being energized. This results in the control rod 18b being displaced somewhat to the left in the direction of the arrow 5. A pivoting movement of the control member 70b in the clockwise direction about the axis 3 comes about by means of the coupling of the control rod 18b thereto. Said rotational movement of the control member 70b initially has no effect whatsoever on the extension device 50b since up to the state of FIG. 2b only the elongated hole 72b is initially displaced without force being applied to the bolt 53b within the elongated hole 72b as a result. However, owing to the bolt 74b pivoting together with the control member 70b in the clockwise direction about the axis 3 and owing to the spring force of the spring 90b acting on the intermediate lever 80b, even said first movement phase of the control member 70b results in the intermediate lever 80b pivoting in the clockwise direction about the axis 3. This results in the covering profile 60b pivoting in the clockwise direction about the axis 1b, since there is a forced coupling between the intermediate lever 80b and the covering profile 60b via the bolt 82b and the elongated hole 62.

Figure 2B:
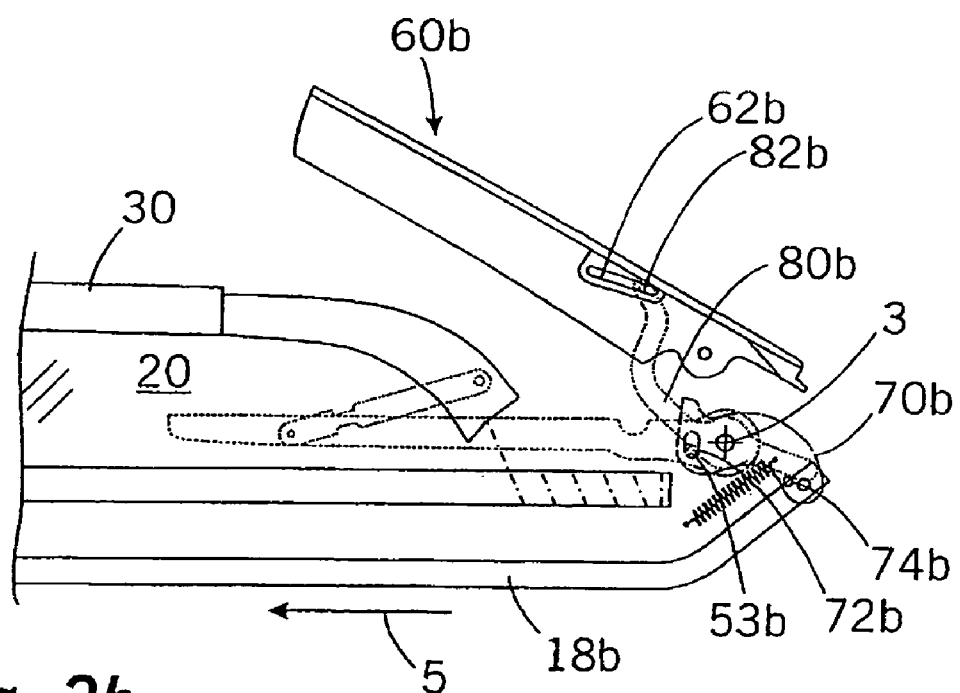

Accordingly, during said first movement phase between the inoperative state of FIG. 2a and the first intermediate state of FIG. 2b, only the covering profiles 60a, 60b are pivoted, thus producing a position from which the movement of the end element 30 and of the sheet-like structure 20 can begin.

Upon a continued movement of the control rod 18b to the left in the direction of the arrow 5, the control member 70b is also pivoted further about the pivot axis 3. In the same manner as described with regard to the transition between FIGS. 2a and 2b, this continued pivoting movement of the control member 70b results in the covering profile 60b likewise continuing to pivot until in the position illustrated in FIG. 2c. However, at the same time, the first lever member 51b of the extension device 50b also pivots to the same extent about the pivot axis 3 as the control member 70b, since the bolt 53b bears against the end of the elongated hole 72b from the intermediate state of FIG. 2b. Said pivoting of the first lever 51b and of the opposite, corresponding first lever 51a (not illustrated) brings about, via the second levers 52a, 52b, a movement of the end element 30 in the direction of the extension direction 2 and at the same time drawing off of the sheet-like structure 20 from the winding shaft 22. The intermediate state of FIG. 2c is reached as soon as a contact lug 76b of the control member 70b comes into touching contact with a corresponding contact surface 64b of the covering profile 60b.

Figure 2C:
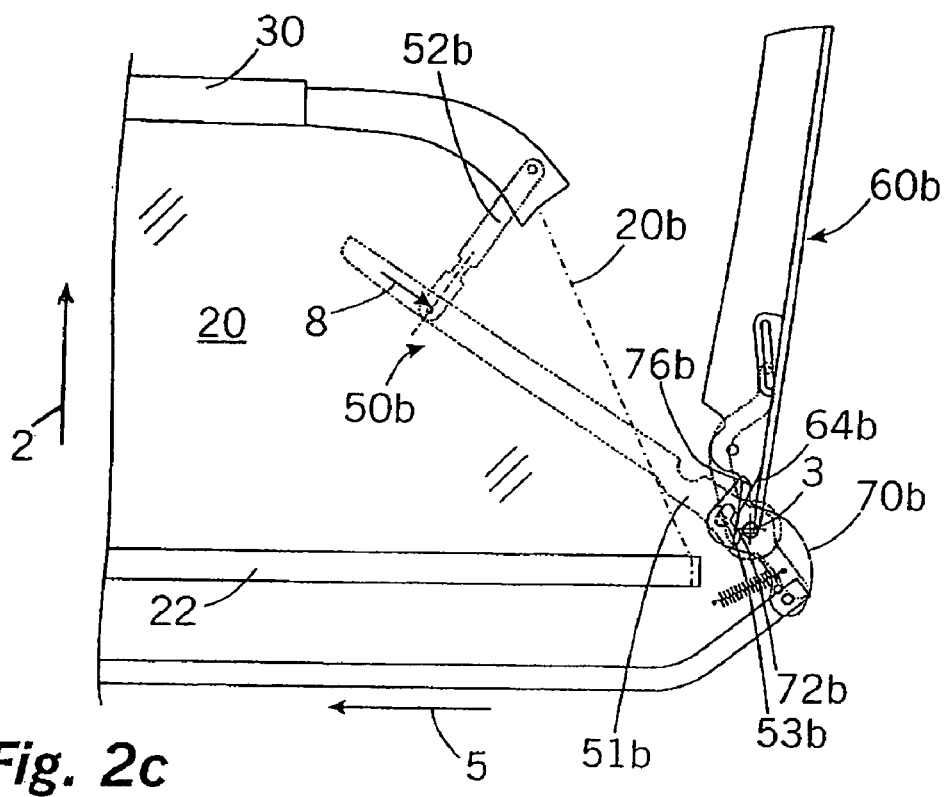

From said intermediate state illustrated in FIG. 2c, a further pivoting movement of the control member 70b in the clockwise direction about the pivot axis 3, said pivoting movement being caused by the control rod 18b, results in said contact lug 76b sliding along the contact surface 64b of the covering profile 60b and applying a torque to said covering profile in the anticlockwise direction about the pivot axis 4, i.e. back in the direction of the initial pivoted position in FIG. 2a. This is therefore associated with the extension 83b of the intermediate lever 80b losing contact with the bolt 74b of the intermediate member 70b.

Accordingly, the pivoting movement of the control member 80b, which pivoting movement is continued from the second intermediate state of FIG. 2c, firstly results in a continued extension of the sheet-like structure 20 and of the end element 30 in the direction of the extension direction 2 and secondly in the covering profile 60b pivoting back anticlockwise counter to the force of the spring 90b.

Figure 2D:
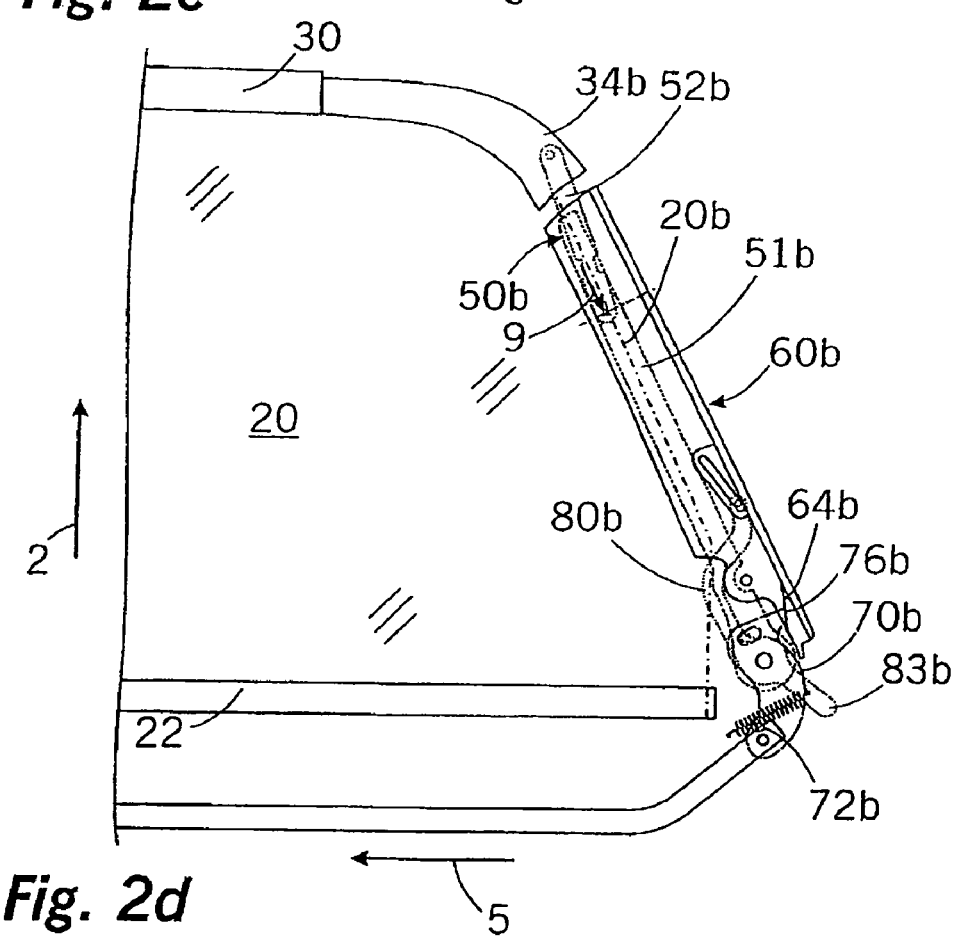

The end position of FIG. 2d is reached when the levers 51b, 52b of the extension device 50b are in a stretched orientation, i.e. are aligned approximately with each other. When said functional state of the extension device 50b is reached, the end element 30 and the sheet-like structure 20 are also in the respective functional position thereof. In said functional state of the system, which state is illustrated in FIG. 2d, the covering profile 60b is also pivoted back anticlockwise to such an extent that said covering profile together with the side edge 20b of the sheet-like structure and with the levers 51b, 52b is aligned with the outer end of the side section 34b of the end element 30. As is also revealed in the illustration of FIG. 1a, in this state the covering profile 60b conceals the levers 51b, 52b, thus producing an esthetic overall impression.

Both in the initial state of FIG. 2a and in the functional state of FIG. 2d, manual pivoting of the covering profile upwards and outwards is prevented in order to prevent misuse. In the initial state of FIG. 2a, this is achieved by the forced coupling of the covering profile 60b with the intermediate lever 80b and by the extension 83b of the intermediate lever 80b bearing against the pin 74b of the control member 70b. In the functional state of FIG. 2d, it is achieved by the covering profile 60b bearing against the contact lug 76b of the control member 70b. In both states, the position of the control member 70b therefore limits the pivotability of the covering profile 60b upwards and outwards.

FIGS. 3a, 3b illustrate the interaction of the extension device 50b and of the covering profile 60b in the functional state of FIGS. 1a and 2d.

For this purpose, a schematic, sectioned view of the levers 51b, 52b in the position of FIG. 2c in the viewing direction of the arrow 8 is first of all illustrated in FIG. 3a. It is apparent in this case that both the lever 51b and the lever 52b each have sections which are formed identically in a mirror-inverted manner with respect to each other on both sides of the sheet-like structure 20 and are initially spaced apart from each other in such a manner that a relative movement of the levers 51b, 52b in relation to the sheet-like structure 20 is possible without hindrance.

The illustration of FIG. 3b relates to the functional state of FIGS. 1a and 2d and shows a viewing direction in the direction of the arrow 9. In said functional state, the extension device 50b is arranged with the levers 51b, 52b within the cavity 66b of the covering profile 60b, which cavity is formed by side sections 68b. In this state, by means of the wedge-shaped cross section of the sections of the lever 51b that are on both sides of the side sections 68b of the covering profile 60b, those sections of the levers 51b, 52b of the extension device 50b which lie opposite each other in a mirror-inverted manner are pressed against each other such that the sheet-like structure 20 located there-between is clamped.

In the state of FIG. 3b, the side borders 20a, 20b of the sheet-like structure 20 are therefore sufficiently fixed such that they cannot deviate out of the region of the extension devices 50a, 50b even in the event of, for example, a severe wind force acting on the sheet-like structure 20.

The invention claimed is:

1. A protection or shading system for a motor vehicle comprising:
    a base;
    a sheet;
    a rigid end element which is fastened to the sheet and is provided at a distal end of the sheet away from the base;
    two extension devices which are fastened on a first side to the base and on a second side to the rigid end element;
    wherein the extension devices are designed so as, by means of mechanical activation by means of a driving means, to transfer the system from an inoperative state, in which the sheet, the rigid end element and the extension device are each in an inoperative position, into a functional state, in which the sheet, the rigid end element and the extension device are each in a functional position; and
    wherein the sheet can be extended between the inoperative position and the functional position in an extension direction away from the base; and
    a covering panel is provided for each extension device, each of the two covering panels being coupled to the base so as to be pivotable about a respective pivot axis which is aligned orthogonally to a plane of the sheet in the functional position thereof and being pivotable into a first pivoted position in which said covering panels bear against the respective extension device in the functional position thereof or at least partially surround said respective extension device.

2. The protection or shading system according to claim 1, wherein the covering panel, in the respective first each pivoted position thereof, has a respective panel section on both sides of the sheet.

3. The protection or shading system according to claim 1, wherein each of the extension devices has two lever members comprising a first lever member being coupled pivotably to the base and a second lever member being coupled pivotably to the first lever member and pivotably to the rigid end element.

4. The protection or shading system according to claim 1, wherein the covering panels are each pivotable into a second pivoted position in which the covering panels:
    at least partially overlap the rigid end element in the extension direction in the inoperative position thereof,
    are aligned with a central section of the rigid end element, and/or
    at least partially cover an extension opening provided for the sheet on the base.

5. The protection or shading system according to claim 4, wherein the rigid end element has a tapered side section laterally adjoining the central section.

6. The protection or shading system according to claim 5, wherein the covering panels only cover the tapered side section in the second pivoted position.

7. The protection or shading system according to claim 1, wherein the extension devices and the respective covering panels are coupled mechanically to each other or are coupled mechanically to a respective common control member such that the sheet can be moved in the extension direction and the covering panels can be pivoted into the first pivoted position via the driving means.

8. The protection or shading system according to claim 7, wherein the driving means is an electric motor of the system.

9. A protection or shading system for a motor vehicle comprising:
- a base;
- a sheet;
- a rigid end element which is fastened to the sheet and is provided at a distal end of the sheet away from the base;
- at least one extension device which is fastened on one side to the base and on the other side to the rigid end element;
- wherein the extension device is designed so as, by means of mechanical activation by means of a driving means, to transfer the system from an inoperative state, in which the sheet, the rigid end element and the extension device are each in an inoperative position, into a functional state, in which the sheet, the rigid end element and the extension device are each in a functional position;
- wherein the sheet can be extended between the inoperative position and the functional position in an extension direction away from the base; and
- a covering panel which is coupled to the base and is pivotable into a first pivoted position in which said covering panel bears against the extension device in the functional position thereof, or at least partially surrounds said extension device;
- wherein the extension device and the covering panel are coupled mechanically to each other or are coupled mechanically to a common control member such that the sheet can be moved in the extension direction and the covering panel can be pivoted into the first pivoted position via the driving means; and
- wherein the mechanical coupling is designed in such a manner that, when the system is transferred by the driving means from the inoperative state into the functional state, the rigid end element starts moving only after pivoting movement of the covering panel has begun.

10. A protection or shading system for a motor vehicle comprising:
- a base;
- a sheet;
- a rigid end element which is fastened to the sheet and is provided at a distal end of the sheet away from the base;
- at least one extension device which is fastened on one side to the base and on the other side to the rigid end element;
- wherein the extension device is designed so as, by means of mechanical activation by means of a driving means, to transfer the system from an inoperative state, in which the sheet, the rigid end element and the extension device are each in an inoperative position, into a functional state, in which the sheet, the rigid end element and the extension device are each in a functional position;
- wherein the sheet can be extended between the inoperative position and the functional position in an extension direction away from the base; and
- a covering panel which is coupled to the base and is pivotable into a first pivoted position in which said covering panel bears against the extension device in the functional position thereof, or at least partially surrounds said extension device;
- wherein the extension device and the covering panel are coupled mechanically to each other or are coupled mechanically to a common control member such that the sheet can be moved in the extension direction and the covering panel can be pivoted into the first pivoted position via the driving means; and
- wherein the covering panel is mechanically coupled to the driving means in such a manner that, during transfer from a second pivoted position into the first pivoted position, the covering panel is first of all moved beyond the first pivoted position and is subsequently moved back into the first pivoted position.

11. A protection or shading system for a motor vehicle comprising:
- a base;
- a sheet;
- a rigid end element which is fastened to the sheet and is provided at a distal end of the sheet away from the base; and
- at least one extension device which is fastened on one side to the base and on the other side to the rigid end element;
- wherein the extension device is designed so as, by means of mechanical activation by means of a driving means, to transfer the system from an inoperative state, in which the sheet, the rigid end element and the extension device are each in an inoperative position, into a functional state, in which the sheet, the rigid end element and the extension device are each in a functional position;
- wherein the sheet can be extended between the inoperative position and the functional position in an extension direction away from the base; and
- a covering panel which is coupled to the base and is pivotable into a first pivoted position in which said covering panel bears against the extension device in the functional position thereof, or at least partially surrounds said extension device; and
- a spring means arranged and/or designed in such a manner that torque is applied to the covering panel in a second pivoted position in a direction of the first pivoted position.

12. A protection or shading system for a motor vehicle comprising:
- a base;
- a sheet;
- a rigid end element which is fastened to the sheet and is provided at a distal end of the sheet away from the base;
- at least one extension device which is fastened on one side to the base and on the other side to the rigid end element;
- wherein the extension device is designed so as, by means of mechanical activation by means of a driving means, to transfer the system from an inoperative state, in which the sheet, the rigid end element and the extension device are each in an inoperative position, into a functional state, in which the sheet, the rigid end element and the extension device are each in a functional position;
- wherein the sheet can be extended between the inoperative position and the functional position in an extension direction away from the base; and
- a covering panel which is coupled to the base and is pivotable into a first pivoted position in which said covering panel bears against the extension device in the functional position thereof, or at least partially surrounds said extension device; and
- wherein the extension device and the covering panel are designed for interaction in such a manner that, in the functional position of the extension device and in the first pivoted position of the covering panel, said extension device and covering panel together bring about a fixing action on the sheet;
- the extension device having a respective extension device section on both sides of the sheet, and the extension device sections are designed to be pressed onto each other by the covering panel in the first pivoted position thereof, in order to deploy the fixing action.

* * * * *